United States Patent

Olez

[11] 4,120,998
[45] Oct. 17, 1978

[54] COMPOSITE STRUCTURE

[75] Inventor: Nejat A. Olez, St. Louis, Mo.

[73] Assignee: Northrop Corporation, Los Angeles, Calif.

[21] Appl. No.: 765,209

[22] Filed: Feb. 3, 1977

[51] Int. Cl.² ............................................. B32B 19/06
[52] U.S. Cl. ..................................... 428/33; 52/309.1;
52/309.13; 52/726; 244/119; 244/131; 244/132;
244/133; 403/268; 403/270; 403/293; 403/377;
428/35; 428/113; 428/166; 428/172; 428/188;
428/232; 428/246; 428/285; 428/286; 428/542;
428/902
[58] Field of Search .............. 428/902, 33, 166, 172,
428/113, 35, 232, 246, 245, 284, 285, 286, 413,
414, 416, 188, 542; 156/169, 171, 172, 293, 294,
187, 304, 544, 303.1; 244/131, 132, 133, 119;
264/136, 137; 52/726, 309.1, 309.13; 403/268,
270, 293, 377

[56] References Cited

U.S. PATENT DOCUMENTS

| | | | |
|---|---|---|---|
| 3,080,268 | 3/1963 | Bjork | 156/172 |
| 3,780,969 | 12/1973 | Nussbaum et al. | 244/123 |
| 3,946,127 | 3/1976 | Eisenmann et al. | 428/902 |
| 3,959,544 | 5/1976 | Rogers | 428/902 |
| 3,978,256 | 8/1976 | James | 244/119 |
| 4,012,549 | 3/1977 | Slysh | 244/119 |
| 4,020,202 | 4/1977 | Kreff | 428/33 |

*Primary Examiner*—George F. Lesmes
*Assistant Examiner*—Stanley S. Silverman
*Attorney, Agent, or Firm*—William W. Rundle; Willard M. Graham

[57] ABSTRACT

A composite structure capable of withstanding multidirectional stress loads in general and in particular high tension and compression loads transmitted to an aircraft center fuselage by wing loading. The structure is essentially a beam formed by inserting two stepped metal end caps into the ends of a graphite/epoxy B-staged tubular strut and subsequently laying-up multidirectional and unidirectional fibers to provide a structure which is in turn cocured and results in a unitized composite wing trunnion structure.

6 Claims, 4 Drawing Figures

COMPOSITE STRUCTURE

BACKGROUND OF THE INVENTION

This invention relates to laminated or reinforced graphite/epoxy primary structure and, more particularly to a composite aircraft wing attachment trunnion capable of withstanding high compression, tension, and torsional loads that heretofore laminated structures have not been capable of withstanding.

It is generally known that some low stress aircraft parts such as access doors and rudders can be designed and manufactured using fiber/metal combinations. In fact, an aircraft wing having aluminum ribs and titanium spars and having an outside skin covering made of boron fibers is disclosed in U.S. Pat. No. 3,780,969. However, the present invention goes beyond these comparatively simple parts to provide a lightweight beam or trunnion which unlike other fiber/metal parts is capable of withstanding high multidirectional stress loads. The trunnion can be bonded directly to an aircraft's main body portion by any curable thermosetting resins such as epoxy polymers.

BRIEF SUMMARY OF INVENTION

The present invention is characterized by its capability to collect high multidirectional loads within relatively small metal end caps and to transfer these loads to full graphite epoxy structure which forms the main portion of the wing attach trunnion. Heretofore, it has not been possible to collect high multidirectional loads, particularly tension and compression loads, within a limited space envelope and transfer these loads to a full graphite epoxy section of the structure which is, in turn, capable of withstanding high multidirectional loads without delaminating. The principal reason for this capability is that graphite fibers exhibit their greatest strength in the direction of the fiber. The present invention has maximized the directional properties of the fibers to form a multiplicity of multidirectional lamina in parallel relationships to imposed multidirectional loads. The composite member comprises a central elongated, hollow rectangular strut of reinforced resin, a special metal end cap fitting into each end of the central strut, and various composite strips and layers applied to form a strong structural component. The strut end caps have stepped sections between which are laid up some of composite strips to increase the strut compressive strength, and windings of other composite strips are provided around the whole remaining assembly in different directions for completing the rigidity of the final component.

It is preferred that curable thermosetting resins such as epoxy polymers be employed in the present invention; however, any good quality thermoplastic resin could be employed. These resins can be applied to the fiber by any suitable method such as impregnation or spraying or bath process to insure thorough wetting of the fibers. The impregnated fibers are partially cured to the B-stage condition to partially solidify the resin and provide a self-supporting composite ply prior to actual lay-up of the composite structure. After the structure is laid-up and completely cured, it can be bonded to metal or to another graphite/epoxy part, such as the main body portion of an aircraft, using a thermosetting epoxy polymer or equivalent. Therefore, it is a primary object of this invention to provide a structure capable of collecting high multidirectional stress loads within a limited space envelope and transferring these loads to a full composite section of the structure capable of withstanding these loads without delaminating.

It is a further object of this invention to provide a structure which can be bonded to other graphite parts such as the main body portion of an aircraft to transfer wing loads thereto. These and other objects and advantages will become clearly apparent from the following detailed description and drawings, all of which are intended to be representative of rather than in any way limiting on the scope of the invention.

DETAIL DESCRIPTION OF INVENTION

Figure 1:
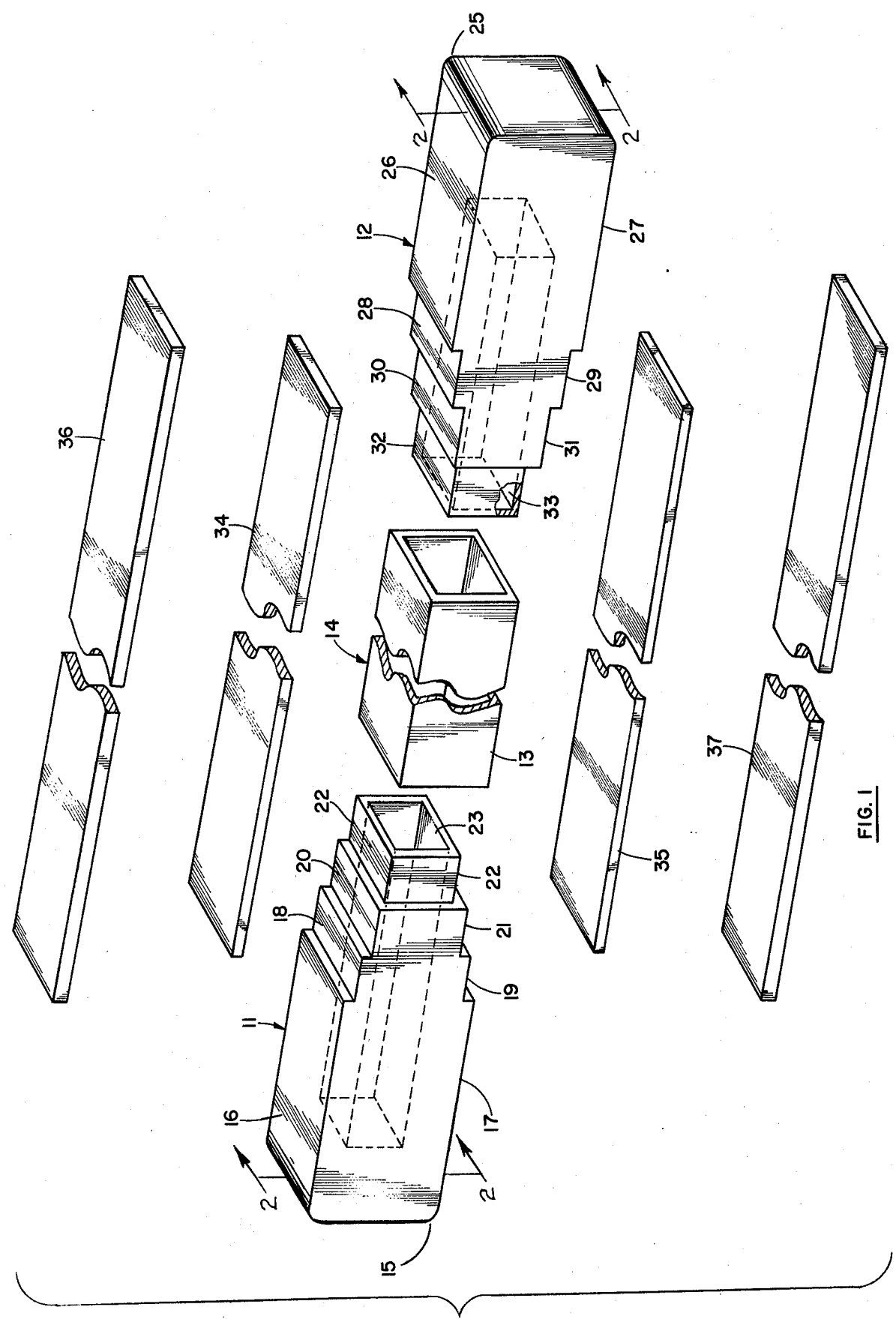
FIG. 1 is a general perspective exploded view of typical strut caps, a tubular strut and composite layers in a preparatory stage before assembly of the same according to the method disclosed herein.

Referring to FIG. 1, the manufacture of a graphite/epoxy composite wing attachment trunnion 10 (shown in FIG. 3) starts with the assembly of a first strut cap 11 to a tubular strut 14. The tubular strut 14 is constructed of a preferably precured graphite/epoxy composite material 13 wherein the filaments are situated at cross-ply angles of plus and minus 45° relative to the longitudinal axis of the tubular strut 14. The tubular strut 14 is fabricated by the conventional method of using woven graphite/epoxy composite material 13, laid up on a male mandrel (not shown) and autoclave cured.

Titanium is preferably selected for manufacture of the first strut cap 11 and a second strut cap 12 at the other end of strut 14, since high wing loads must be collected and transferred within limited space envelopes to the full grahite epoxy section of the wing attach trunnion 10. Titanium also provides a weight-efficient design that maintains proper thermal compatibility when cocured with graphite/epoxy materials. The first strut cap 11 is of a general oblong shape having substantially rounded outer end corners 15 in a frontal plane, a flat top surface 16 at the outer end, a flat bottom surface 17, a first top stepped section 18 inwardly from top surface 6, a first bottom stepped section 19, a second top stepped section 20, a second bottom stepped section 21, and terminates in a relieved inner end section 22. A longitudinal cavity 23 is provided in the first strut cap 11, open at the inner end, primarily for weight reduction. The second strut cap 12 is identical to the first strut cap 11 and has rounded end corners 25, a flat top surface 26, a flat bottom surface 27, a first top stepped section 28, a first bottom stepped section 29, a second top stepped section 30, a second bottom stepped section 31, a relieved end section 32 and a cavity 33.

A curable adhesive resin, such as B-staged epoxy, is now applied to relieved end sections 22 and 32 of the first strut cap 11 and second strut cap 12 respectively, and the strut caps 11 and 12 inserted into the tubular strut 14. Next a first layer of B-staged base filaments 34 is laid-up using conventional graphite fiber composite material which has substantially one-half of the total filaments inclined at an angle of plus 45° and one-half of the total filaments inclined at an angle of minus 45° with respect to the longitudinal axis of the tubular strut 14. The first layer of base filaments 34 covers the second top stepped section 20 located on the first strut cap 11, the exposed top surface of strut 14 and the second top stepped section 30 located on the second strut cap 12. A second layer of base filaments 35, identical to the first layer of base filaments 34 is then laid-up to cover the second bottom stepped section 21 located on strut cap 11, the exposed bottom surface of strut 14 and the second bottom stepped section 31 located on the second strut cap 12.

An upper intermediate layer 36 of plus and minus 45° filaments is then laid-up extending across the first top stepped section 18 located on the first strut cap 11 to the outer end of first top stepped section 28 located on the second strut cap 12; and a lower intermediate layer 37, identical to the upper intermediate layer 36, is laid-up extending across the first bottom step 19 to the outer end of first bottom step 29. It is this combination of 45° cross-ply composite layers between the stepped shoulders of the strut cap sections within the lay-up that provides the capability for the wing attach trunnion 10 to withstand high compression loads that heretofore composite structures have not been able to tolerate.

Figure 2:
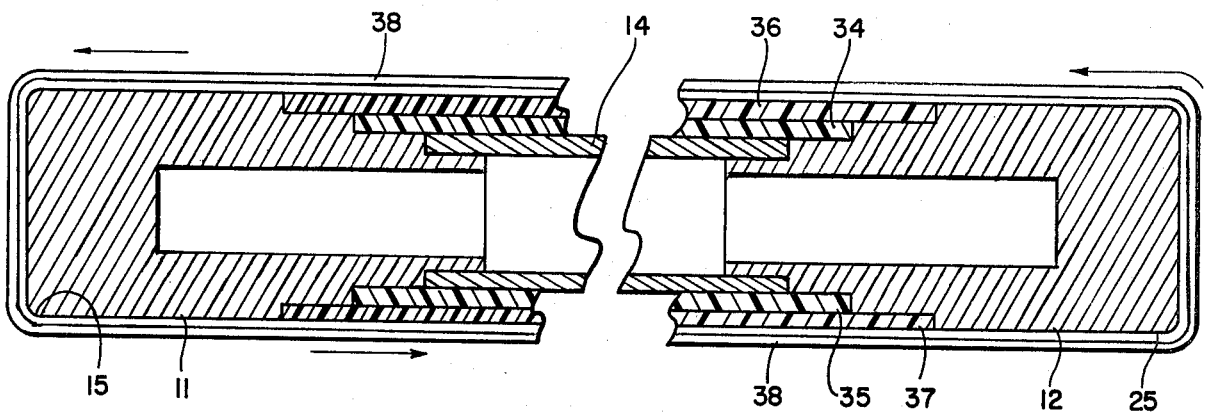
FIG. 2 is a longitudinal section view of the assembled parts of FIG. 1, taken as indicated by line 2–2 in FIG. 1, and also showing a longitudinal composite winding thereon.

Referring now to FIG. 2, the next step in the lay-up is to hoop-wind a tape of unidirectional B-stage graphite/epoxy fibers 38 longitudinally around the curved end 15 of the first strut cap 11 and the curved end 25 of the second strut cap 12, over the tops and bottoms of the caps and over the intermediate layers 36 and 37. At least two layers of this tape are usually preferred. These fibers 38 greatly increase the ability of the attach trunnion 10 to withstand high tension loads, since the graphite fibers are lengthwise of the tape as wrapped.

Figure 3:
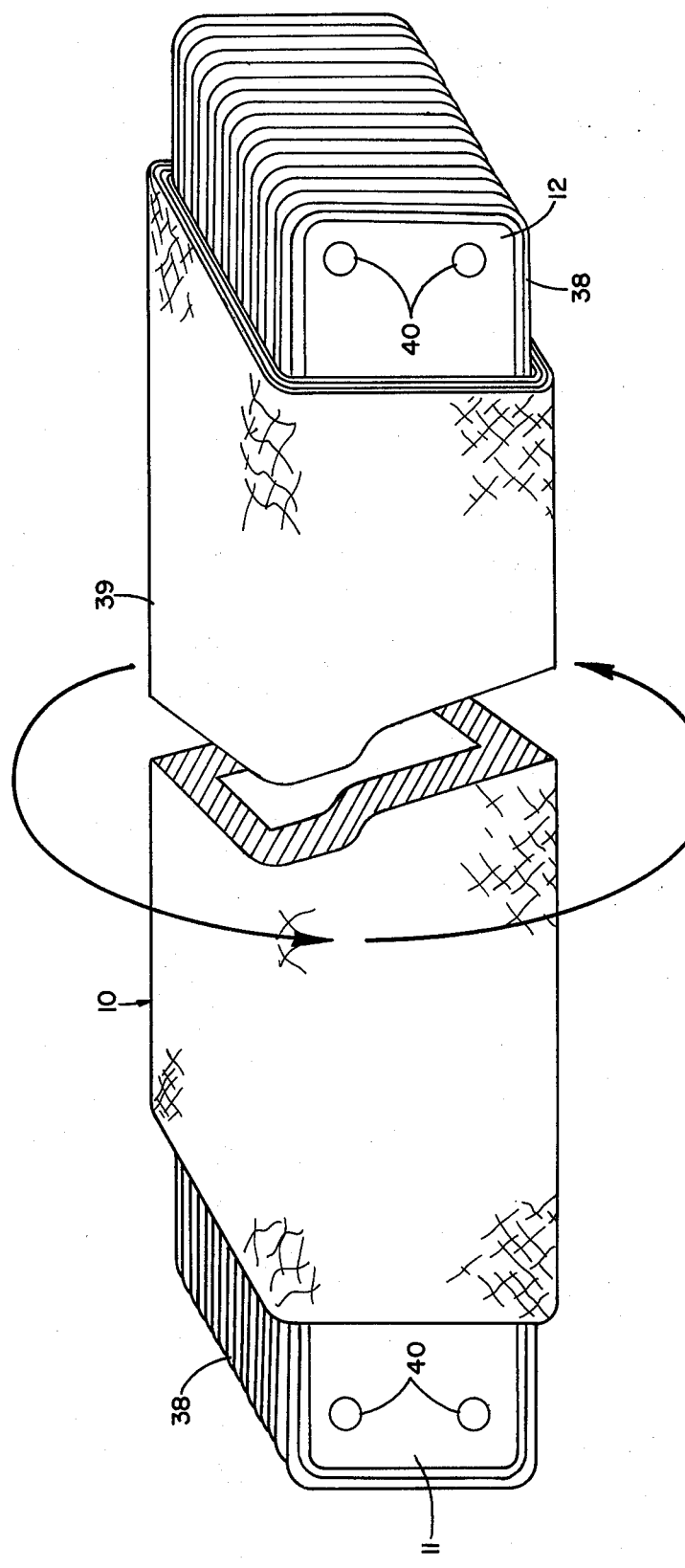
FIG. 3 is a perspective view, partly in cross section, of the completed wing attach trunnion.

Referring now to FIG. 3, the lay-up is next wrapped transversely with a B-staged graphite/epoxy woven fabric 39 having a weave orientation of plus and minus 45° relative to the longitudinal axis of attach trunnion 10. At least two layers of fabric 39 are usually preferred. The primary purpose of the woven fabric 39 is to assure that the attach trunnion 10 will not delaminate when subjected to either unidirectional or multi-directional stress loads. The assembled attach trunnion 10 thus formed is then cocured using pressures and temperatures well known in the industry. After the attach trunnion 10 is cured, holes 40 are drilled in each end of the attach trunnion 10 to provide a means for connecting wing panels to the attach trunnion 10. The strut cavities 23 and 33 end before reaching the location of holes 40, so that holes 40 are through completely solid metal of the end caps.

Figure 4:
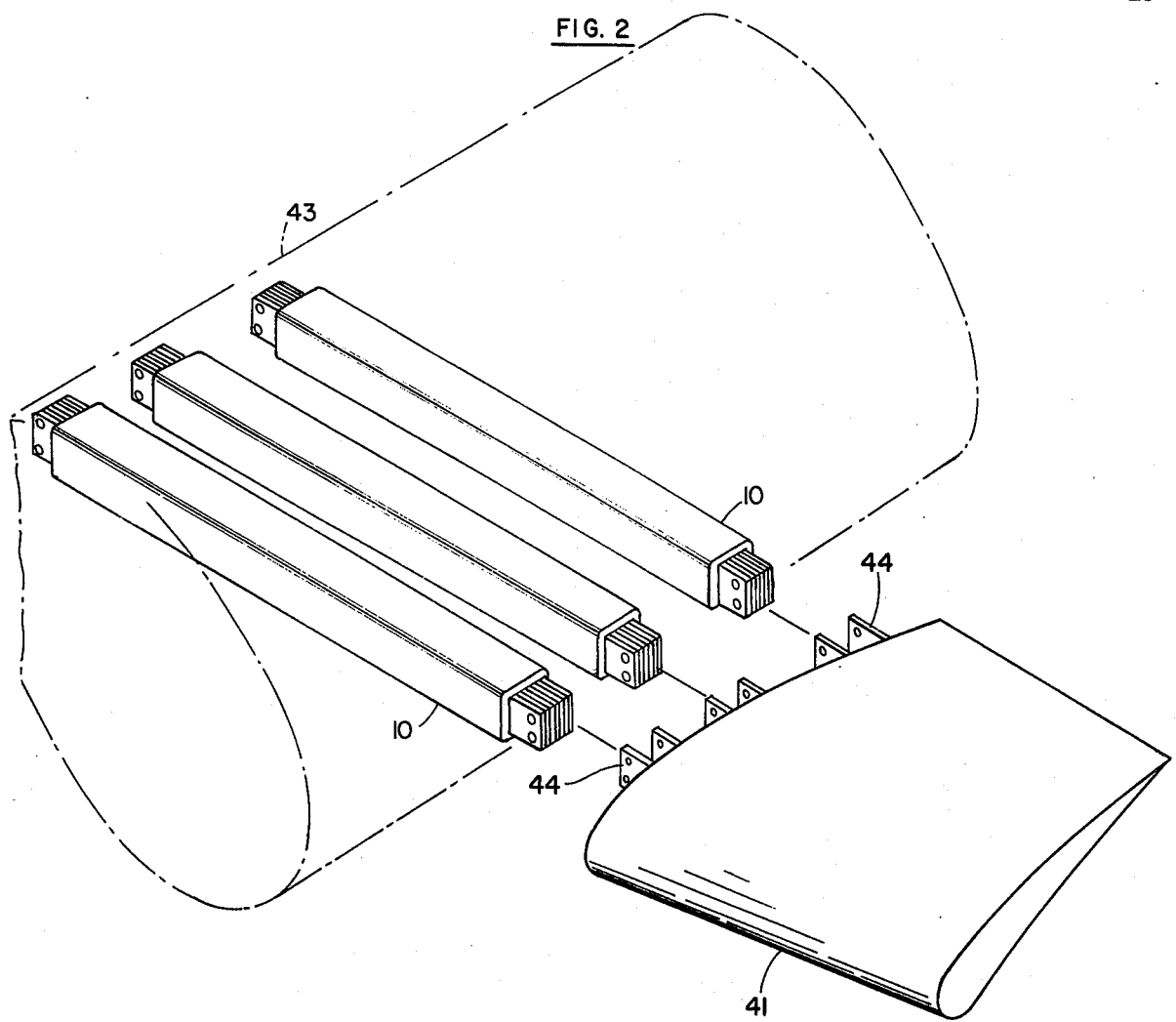
FIG. 4 is a simplified perspective view of completed wing attachment trunnions bonded to the main body portion of an aircraft structure for connection of a wing thereto.

In actual aircraft usage, as shown in FIG. 4, a plurality of attach trunnions 10 are bonded, by epoxy polymers, to the structure of an aircraft fuselage 43 by which wing loads are transferred to the main body portion of the aircraft. FIG. 4 illustrates only one wing assembly 41 with mountings 44 for bolting or otherwise attaching to one end of each trunnion 10.

Obviously, additional fibers an be added as above, to further increase the strength of the trunnion 10. It should be noted that while the present invention is described in terms of an aircraft wing trunnion, no limitation thereto is intended, since there are obviously other applications where the invention can be used advantageously within the scope of the appended claims.

I claim:

1. a cocured bonded structure characterized by its capability to collect multidirectional stress loads within a limited space envelope and transfer said loads to full composite section capable of withstanding said loads, comprising:
   a. a pair of rigid strut caps,
   b. each of said strut caps having a generally rectangular outer end and an inner end, top and bottom stepped down sections extending from said outer end toward said inner end, and a section adjacent said inner end being relieved on all four sides,
   c. a tubular rectangular strut positioned between said strut caps and fitting over said relieved inner end section of each said strut cap, said strut composed of a precured multidirectional fiber composite,
   d. a plurality of straight layers of composite multidirectional oriented filaments extending between respective said top stepped sections of said strut caps, the first said layer contacting the top of said strut and the next, longer, layer contacting the top of the preceding layer,
   e. a plurality of straight layers of composite multidirectional oriented filaments similarly extending between respective said bottom stepped sections of said strut caps,
   f. a plurality of layers of hoop-wound unidirectional fibers wrapped around said outer ends of said strut caps from top to bottom along said preceding straight layers, and
   g. an outer wrap of woven fiber fabric surrounding the preceding structure at a right angle to said hoop-wound layers, said outer wrap being spaced inwardly from each outer end of said strut caps to leave opposite side portions of said caps exposed near said outer end thereof.

2. The structure of claim 1 in which said composite filaments and fibers comprise resin impregnated graphite filaments of the type partially cured to a B-stage and completely curable at a desired later time.

3. The structure of claim 1 in which at least one structural fastener connecting hole is provided from side to side through solid portions of said strut caps near the outer ends thereof.

4. The structure of claim 1 in which each of said strut caps has a central cavity facing the said inner ends thereof.

5. The structure of claim 1 including a curable resin adhesive between said relieved inner end sections of said strut caps and the mating inside end portions of said strut.

6. The structure of claim 1 wherein said strut caps are metal, and wherein said composite filaments and fibers are resin impregnated graphite filaments.

* * * * *